United States Patent
Watson

(10) Patent No.: US 8,371,064 B2
(45) Date of Patent: Feb. 12, 2013

(54) INSECT AND ARACHNID TRAP

(76) Inventor: Robin Watson, Quarrier's Village (GB)

(*) Notice: Subject to any disclaimer, the term of this patent is extended or adjusted under 35 U.S.C. 154(b) by 1073 days.

(21) Appl. No.: 10/554,649

(22) PCT Filed: Apr. 26, 2004

(86) PCT No.: PCT/GB2004/001757
§ 371 (c)(1),
(2), (4) Date: Oct. 25, 2005

(87) PCT Pub. No.: WO2004/095919
PCT Pub. Date: Nov. 11, 2004

(65) Prior Publication Data
US 2006/0265942 A1 Nov. 30, 2006

(30) Foreign Application Priority Data
Apr. 26, 2003 (GB) .................... 0309572.6

(51) Int. Cl.
*A01M 1/14* (2006.01)
(52) U.S. Cl. .......................................... 43/114
(58) Field of Classification Search ............ 43/115, 43/116, 108, 114
See application file for complete search history.

(56) References Cited

U.S. PATENT DOCUMENTS

| | | | |
|---|---|---|---|
| RE11,000 E * | 4/1889 | Thum | 43/115 |
| 418,803 A | 1/1890 | Medford | |
| 431,537 A * | 7/1890 | Trenner | 43/114 |
| 438,417 A * | 10/1890 | Krull | 43/114 |
| 469,021 A * | 2/1892 | Smith | 43/114 |
| 885,461 A * | 4/1908 | Fever | 43/115 |
| 2,138,926 A * | 12/1938 | Karfiol | 43/114 |
| 2,911,756 A * | 11/1959 | Geary | 43/114 |
| 4,044,495 A | 8/1977 | Nishimura et al. | |
| 4,438,584 A * | 3/1984 | Baker et al. | 43/58 |
| 4,709,504 A * | 12/1987 | Andric | 43/114 |
| 4,800,671 A * | 1/1989 | Olson | 43/114 |
| 4,829,702 A | 5/1989 | Silvandersson | |
| 5,815,981 A * | 10/1998 | Dowling et al. | 43/114 |
| 6,998,133 B2 * | 2/2006 | Simpson | 43/114 |
| 7,676,985 B1 * | 3/2010 | Perkins | 43/114 |
| 2007/0193109 A1* | 8/2007 | Chyun | 43/114 |
| 2008/0052982 A1* | 3/2008 | Windsor | 43/114 |

OTHER PUBLICATIONS

PCT Search Report in connection with PCT Application No. PCT/GB2004/001757, Publication No. WO 2004/095919.
Nippon Petrochemicals Co Ltd., XP002432040, Database WPI Week 198020, Mar. 31, 1980, London, GB.
European Search Report, May 3, 2007, Moeremans, Benoit.

* cited by examiner

*Primary Examiner* — Darren W Ark
(74) *Attorney, Agent, or Firm* — Benesch, Friedlander, Coplan & Aronoff LLP

(57) ABSTRACT

An insect and arachnid trap (10, 100) comprises a substrate (12) having a top surface (14) onto which a sticky substance (24) is deposited. One embodiment of the trap (10) is provided with a reinforcing rib (26) to reinforce the thin sheet substrate. The trap (10, 100) may also have a channel (22, 22) into which the sticky substance (24) is deposited. The top surface (14) may have a smooth finish and be inclined to the horizontal in order to prevent trapped insects and arachnids from extricating themselves from the sticky substance. The sticky substance is a composition which includes polybutene oil and polyisobutylene. The sticky substance preferably includes 5-15 wt % polyisobutylene. This sticky substance in combination with the channel and smooth top surface provides an insect and arachnid trap which is more effective than known examples. The reinforcing rib ensures that the substrate (12) does not fold back upon itself when handled after use. Contact with trapped insects or arachnids is thus avoided.

16 Claims, 5 Drawing Sheets

INSECT AND ARACHNID TRAP

The present invention relates to an apparatus for trapping insects, arachnids and similar arthropods.

Traditional arrangements for trapping insects consist of thin, flexible strips or coils of paper or plastic coated with a sticky film. They are normally suspended from ceilings or else adhered to a window pane. Although such arrangements are reasonably effective at trapping flying insects, they are not particularly effective at trapping arachnids. This is due to arachnids being able to remove themselves from the sticky film using their free legs to connect with an adjacent surface and pull themselves free. A further disadvantage with the aforementioned arrangements is that although the sticky films can trap insects, they are not sufficiently adhesive to successfully trap arachnids. Many species of arachnid secrete a type of oil through their feet in order to avoid sticking to their own webs. As a result, they can also use these secretions to avoid adhering to the films in traditional insect traps. Furthermore, flypaper often has the undesirable effect of sticking itself to people or objects, for example, when stood upon by a person. Finally, flypapers and similar traps are conventionally thin sheets of paper or plastic. As a result, they have very little rigidity and can fold back on themselves when a used trap is being disposed of. This can be an unpleasant experience for someone who has a fear of insects or arachnids, as they do not wish to come into contact with the insects or arachnids, even when they have been successfully trapped.

It is an object of the present invention to provide an insect and arachnid trap that obviates or mitigates one or more of the disadvantages referred to above.

According to a first aspect of the present invention, there is provided an insect and arachnid trap comprising a substrate having a top surface and a bottom surface, wherein at least a portion of the top surface has a sticky substance applied thereto, and wherein the substrate has at least one reinforcement rib.

Preferably, the substrate is formed from a plastics material and the at least one rib is integrally formed with the substrate.

Preferably, the substrate is an elongate sheet having a longitudinal axis, and wherein the at least one rib runs substantially parallel to the longitudinal axis.

Preferably, the substrate further includes a channel formed in the top surface, and the sticky substance is located in the channel.

Preferably, the at least one rib is located in the channel.

Preferably, the channel is broader at its base than at its top. Preferably, the channel has a depth of between 1.5 and 2 mm.

According to a second aspect of the present invention, there is provided an insect and arachnid trap comprising a substrate having a top surface and a bottom surface, wherein the substrate has at least one channel formed in the top surface, and wherein at least a portion of the channel contains a sticky substance.

Preferably, the substrate is an elongate sheet having a longitudinal axis, and wherein the channel runs substantially parallel to the longitudinal axis.

Preferably, the trap further comprises at least one reinforcing rib located in the channel. Preferably, the rib is integrally formed with the substrate. Preferably, the reinforcing rib runs parallel with the channel.

Preferably, at least a portion of the top surface of the substrate inclines upwardly from an edge of the substrate to the channel. In a preferred embodiment, the channel substantially bisects the top surface of the substrate such that the top surface has first and second top surface portions, each of the top surface portions inclined upwardly from an edge of the substrate to the channel.

Preferably, the channel is broader at its base than at its top. Preferably, the channel has a depth of between 1.5 and 2 mm.

Preferably, the substrate is substantially transparent.

Preferably, the top surface is provided with a substantially smooth finish.

Preferably, the sticky substance is a composition including polybutene oil and polyisobutylene. Most preferably, the sticky substance includes between 5 and 15 wt % polyisobutylene.

In a preferred embodiment the sticky substance is applied to the substrate in strips. Alternatively, the sticky substance is applied to the substrate in fluid form.

Preferably, at least a portion of the bottom surface is coated with an adhesive adapted to secure the trap to a surface.

Preferably, the trap further comprises mechanical fixing means adapted to fix the trap to an adjacent trap. The mechanical fixing means comprises a male fixing element at a first end of the substrate and a female fixing element at a second end of the substrate. The mechanical fixing means is adapted to permit adjacent traps to be folded on top of one another.

Embodiments of the present invention will now be described, by way of example only, with reference to the accompanying drawings, in which.

Figure 1:
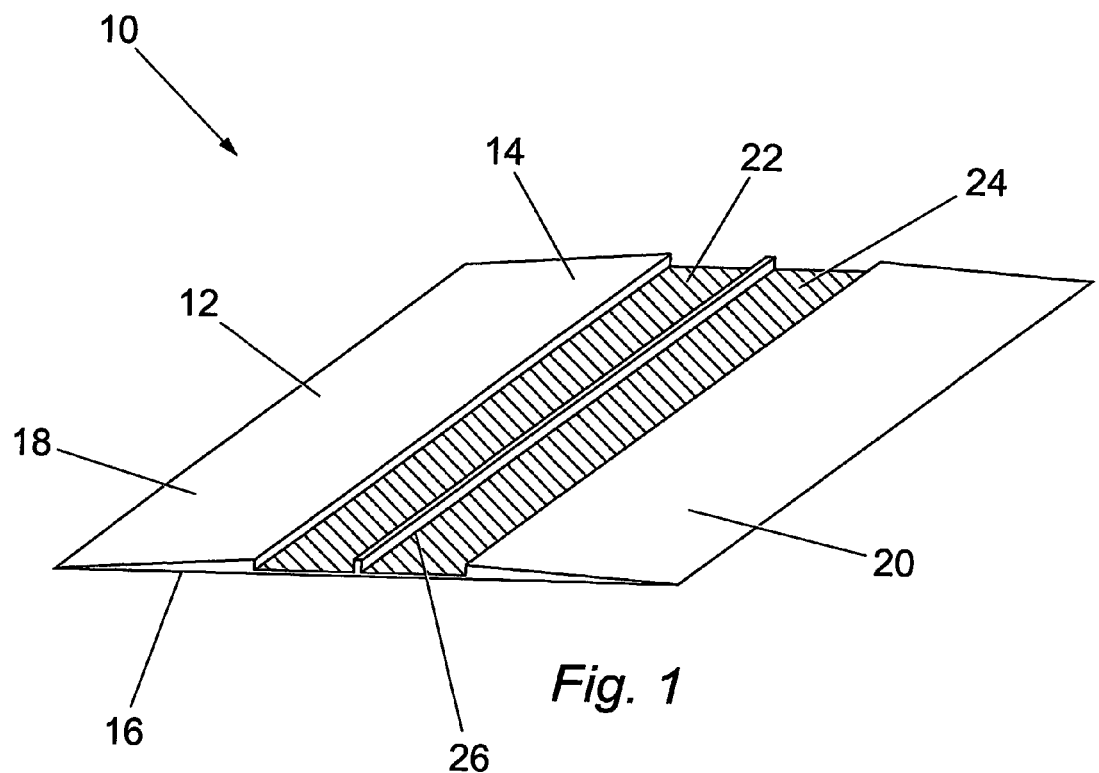
FIG. 1 is a perspective view of an insect trap in accordance with the present invention.
Figure 3A:
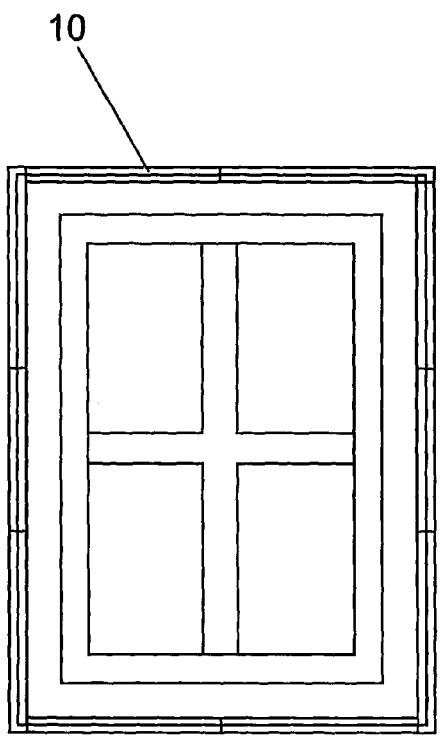
Figure 3B:
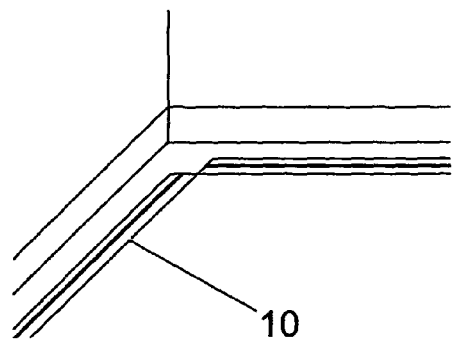
Figure 4:
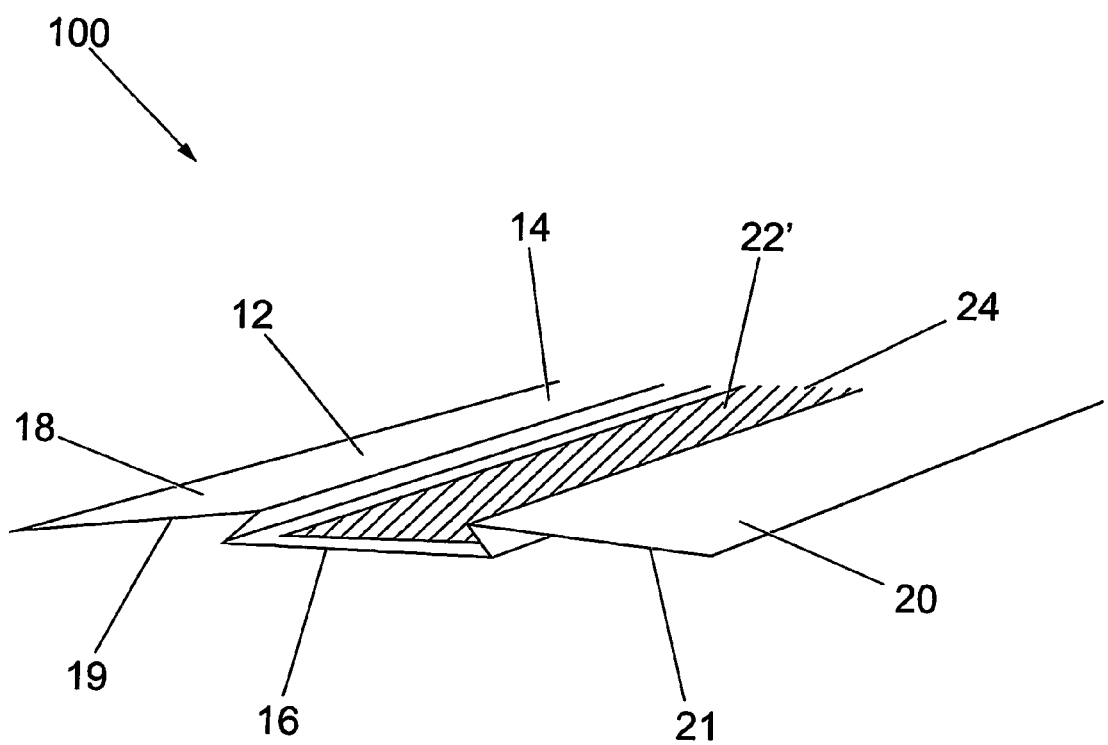
Figure 5:
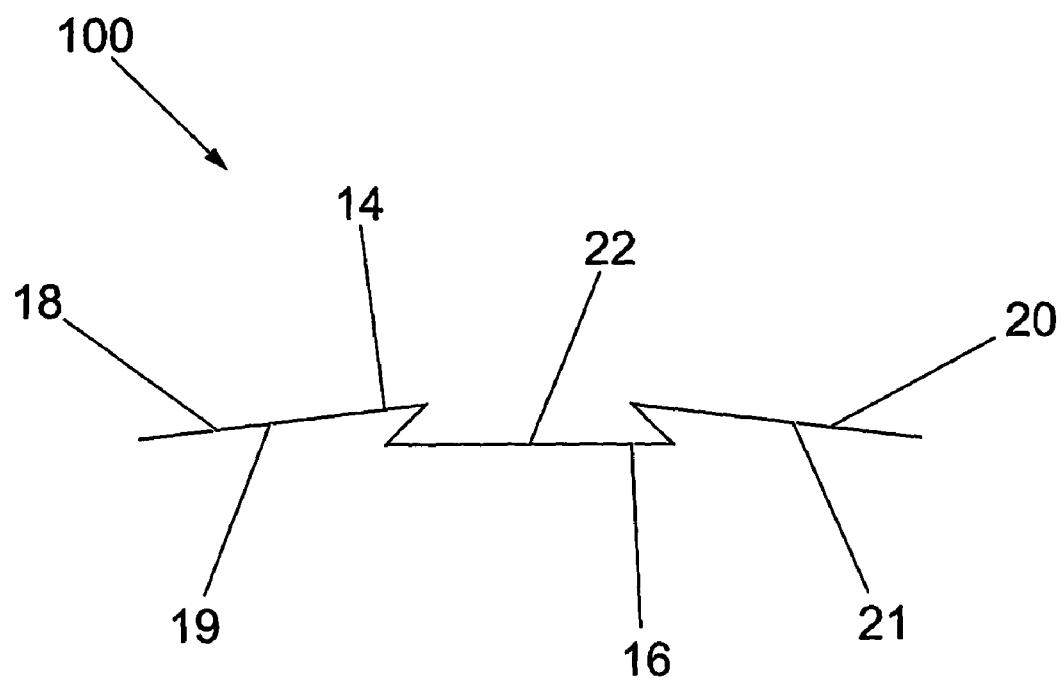

FIGS. 3(a) and 3(b) show examples of the applications of the insect trap of FIG. 1;

FIG. 4 is a perspective view of a second embodiment of an insect trap in accordance with the present invention; and FIG. 5 is a side view of the insect trap of FIG. 4.

Figure 2:
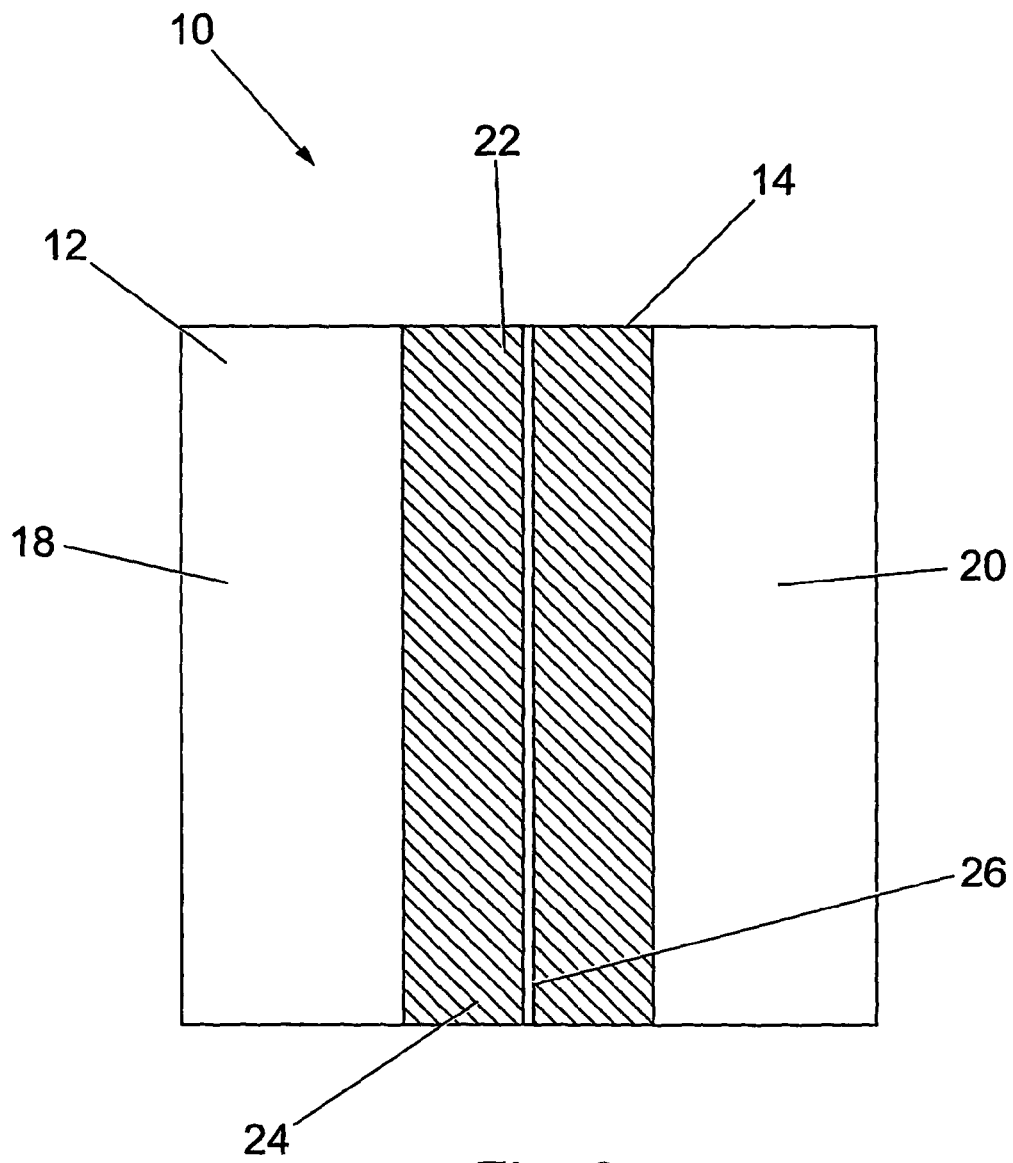
FIG. 2 is a top view of the insect trap of FIG. 1.

Referring to FIGS. 1 and 2, an insect trap 10 comprises an elongate substrate, or body portion, 12 having a top surface 14 and a bottom surface 16.

The top surface 14 comprises two top surface portions 18, 20 which incline upwardly in a lateral direction from the longitudinal edges of the body portion 12 towards the centre of the body portion 12. The top surface portions 18, 20 are separated from one another by a channel 22, which runs longitudinally along the body portion 12. The top surface portions 18, 20 incline in opposing directions, as can be seen in FIG. 1. The top surface portions 18, 20 are also provided with a smooth finish to prevent insects from removing themselves from the trap 10, as will be explained below.

The channel 22 is substantially U-shaped in cross-section and contains a sticky substance 24. By sticky it is meant that the substance 24 is intended to have objects, in this case insects and arachnids, adhere or stick thereto. The sticky substance 24 comprises a mixture of polybutene oil and polyisobutylene. In a preferred embodiment, the ideal composition of the sticky substance 24 is 90 wt % polybutene oil and 10 wt % polyisobutylene. However, tests have shown that the sticky substance 24 is also effective with a composition of 5-15 wt % polyisobutylene and the remainder polybutene oil. The polyisobutylene is added to the polybutene oil in order to improve the cohesion, and hence the sticking properties, of the material. Without the polyisobutylene, the viscosity of the polybutene oil could be too great or too small to trap insects and arachnids. If the polybutene oil is too viscous, the insect or arachnid can walk across the top of the sticky substance. If the polybutene oil is not viscous enough, the insect or arachnid can pull its legs out of the material, and the material will also run if the trap is fixed to a non-horizontal surface. By adding the polyisobutylene to the material, an ideal viscosity for the material can be achieved. Further ingredients, e.g. wax, may be added to the composition depending on the requirements of the application.

The channel 22 substantially bisects the top surface 14. It also may have a reinforcement rib, or support, 26 which is positioned in the centre of the channel portion 22 and which runs parallel to the channel 22. The support 26 prevents any larger unwanted objects coming into contact with the sticky substance 24, for example if a person inadvertently stands on the insect trap 10. The support 26 also provides rigidity to the trap 10 for when the trap is being handled, either before or after use.

The rib 26 is a thin strip that can be either added to the channel portion 22 after manufacture or can be integrally formed with the body portion 12 during manufacture. The rib 26 is thick enough to allow a person to stand upon the insect trap 10 and not break the rib 26, and also thin enough to allow a sufficient area of sticky substance 24 to be applied to the channel portion 22. The sticky substance 24 may either be applied in the channel 22 in pre-formed strips or else in the form of a liquid or paste.

The illustrated embodiment has a channel portion 22 which has a depth of between 1.5 and 2 mm. However it should be appreciated that this depth could be greater or less than this amount, depending on the application and the insects/arachnids the trap is intended to catch.

The bottom surface 16 of the trap 10 is substantially flat, thereby allowing the trap 10 to be placed flush on a surface. The bottom surface 16 may include an adhesive material or the like, to allow the insect trap 10 to be removably mounted to surfaces such as floors or walls, as shown in the examples of FIGS. 3(a) and 3(b). FIG. 3(a) shows a plurality of traps 10 positioned around the circumference of a window. FIG. 3(b) shows a pair of traps 10 positioned in the corner of a room.

The preferred material of construction of the insect trap 10 is a plastics material which can be moulded into the desired shape. The trap 10 can be moulded in one piece, including the rib 26. Most preferably, the trap is manufactured from a polymeric material, such as polyvinylchloride (PVC) or the like. The trap 10 is also preferably made from a transparent material, in order to minimise the visual impact of the trap.

A second embodiment of the trap, generally designated 100, is shown in FIGS. 4 and 5. The features of the trap shared by the first and second embodiments 10, 100 are designated with the same reference numerals used in respect of FIGS. 1 and 2 described above. As with the first embodiment, the top surface 14 of the trap 100 also comprises two top surface portions 18, 20 which incline upwardly in a lateral direction from the longitudinal edges of the body portion 12 towards the centre of the body portion 12. The top surface portions 18, 20 are separated from one another by a channel 22', which runs longitudinally along the body portion 12. The top surface portions 18, 20 incline in opposing directions, as can be seen in FIG. 4, and are provided with a smooth finish to prevent insects from removing themselves from the trap 10, as will be explained below.

The channel 22' has a substantially U-shaped profile, but it is broader at its base than at its top, as seen best in FIG. 5. The channel 22' contains an sticky substance 24 which may be laid in strips or else applied as a liquid or paste. The channel 22' again substantially bisects the top surface 14. It also may have a rib (not shown) which is positioned in the centre of the channel 22' and which runs parallel thereto.

The trap 100 has a bottom surface 16 which corresponds with the bottom of the channel 22'. The underside of the trap 100 is also provided with first and second cut-away portions 19, 21. This allows the insect trap 100 to be manufactured from less material than the trap 10 and consequently weighs less. The bottom surface 16 may again be placed flush on a surface. The bottom surface 16 may include an adhesive material or the like, to allow the insect trap 100 to be removably mounted to surfaces such as floors or walls.

In operation, the insect trap 10, 100 is placed in a position where insects and arachnids are likely to be found, such as by windows, doors and skirting boards, for example. With the trap 10, 100 in position, an insect or arachnid crawls or lands on the sticky substance 24 in the channel 22, 22' of the trap 10, 100 and becomes trapped. Combined with the effectiveness of the sticky substance 24, the depth of the channel 22 and the smoothed surfaces 18, 20 either side do not allow the insect to get any grip with any free legs and thus prevents them from removing themselves from the trap 10, 100.

A third preferred embodiment of the trap comprises a thin, substantially flat plastic sheet. The third embodiment differs from the first and second embodiments in that the trap does not have a channel member or inclined top surfaces. The sheet is provided with one or more strengthening ribs which are preferably integrally formed with the sheet, although they may also be added to the sheet later. The ribs can run in any direction on the sheet, but ideally run longitudinally along the sheet in the same manner as that described in the first embodiment. The same sticky substance is applied to a portion of the top surface of the plastic sheet as is applied in the first and second embodiments. The sheet is preferably transparent to minimise the visual impact of the trap.

Any insects or arachnids walking across or landing on the sticky substance on the sheet will be trapped there. The upper surface of the sheet can also be provided with a smooth finish so that an insect trapped near the edge of the sticky substance cannot get purchase to extricate itself. When disposing of the trap, the strengthening rib(s) ensure that the thin sheet cannot fold back on itself, as conventional flypapers can do. This avoids the user potentially coming into contact with a trapped insect or arachnid when disposing of the trap.

The insect trap 10, 100 may be replaced and disposed of periodically once a number of insects have been trapped. If provided in strips, the sticky substance 24 may also be replaced separately from the trap 10, 100.

The insect trap of the present invention is provided with a novel composition of sticky substance which ensures that insects and arachnids are trapped whilst also ensuring that the viscosity of the material is great enough to avoid any running of the material when the trap is placed on any non-horizontal surface. The novel composition is also such that it counteracts any oil secretions from arachnids in order to ensure that arachnids cannot extricate themselves from the trap once caught. The addition of a channel and smooth, inclined sides to the trap also further improves the effectiveness of the trap. Providing one or more strengthening ribs on the trap also ensures that the trap cannot fold over when being disposed of. As a result, the user is less likely to come into contact with the trapped insects or arachnids when disposing of the trap. If the trap is provided with a channel, the rib(s) located in the channel can also prevent objects inadvertently coming into contact with the sticky substance 24 within the channel 22.

Although the preferred embodiments of the trap are described by themselves, the trap may further comprise attachment means for attaching the trap to other adjacent traps. An example of such an attachment means is a male-female clip arrangement for the traps to be simply clipped together. One end of each trap has a male clip member, whilst the opposite end of the trap has a female member to receive the male clip of an adjacent trap. The clips can also be adapted to act as a pivot, so that a trap can be folded over on top of an adjacent trap with the sticky surfaces of each trap coming together. In this way, disposal of the used traps and any trapped insects and arachnids can be made easier for the user.

The trap may also be formed in a manner so as to allow the traps to fit around corners, possibly by providing traps having one tapered end or else traps having an L-shape. Furthermore, the channel does not need to be in the centre of the trap. Instead, it could be located adjacent one edge of the body with the entire top surface inclining upwardly to the channel from the opposite edge of the body.

Additional ribs may also be provided in the channel, dependent on the length and width of the channel. Finally, although the preferred fixing means for the bottom surface of the trap is an adhesive, the plastics material from which the body is made can be of a suitable softness that removable pins, staples or nails may be used to fix the trap to a surface.

These and other modifications and improvements may be made without departing from the scope of the present invention.

The invention claimed is:

1. An insect and arachnid trap comprising a substrate having a top surface and a bottom surface, wherein the substrate has at least one channel formed in the top surface, the at least one channel including a pair of sidewalls extending downwards from the top surface and at least a portion of the at least one channel containing a sticky substance, wherein at a least a portion of the top surface of the substrate inclines upwardly from an edge of the substrate to the at least one channel and no part of the top surface overhangs the substrate.

2. The trap of claim 1, wherein the substrate is an elongate sheet having a longitudinal axis, and wherein the at least one channel runs substantially parallel to the longitudinal axis.

3. The trap of claim 1, wherein the trap further comprises at least one reinforcing rib located in the at least one channel.

4. The trap of claim 3, wherein the at least one rib is integrally formed with the substrate.

5. The trap of claim 3, wherein the at least one reinforcing rib runs parallel with the at least one channel.

6. The trap of claim 1, wherein the edge of the substrate further comprises first and second edges of the substrate and wherein the at least one channel substantially bisects the top surface of the substrate such that the top surface has first and second top surface portions, each of the top surface portions inclined upwardly from a respective one of the first and second edges of the substrate to the at least one channel.

7. The trap of claim 1, wherein the at least one channel has a depth of between 1.5 and 2 mm.

8. The trap of claim 1, wherein the substrate is substantially transparent.

9. The trap of claim 1, wherein the sticky substance is a composition including polybutene oil and polyisobutylene.

10. The trap of claim 9, wherein the sticky substance includes between 5 and 15 wt % polyisobutylene.

11. The trap of claim 1, wherein the sticky substance is applied to the substrate in strips.

12. The trap of claim 1, wherein the sticky substance is applied to the substrate in fluid form.

13. The trap of claim 1, wherein at least a portion of the bottom surface is coated with an adhesive adapted to secure the trap to a surface.

14. The trap of claim 1, wherein the top surface is provided with a substantially smooth finish.

15. A trap comprising a substrate having a top surface and a bottom surface, the substrate having at least one channel formed in the top surface, at least a portion of the at least one channel containing a sticky substance, wherein at least a portion of the top surface of the substrate inclines upwardly from an edge of the substrate to the at least one channel, wherein no part of the top surface overhangs the channel, and wherein no part of the top surface overhangs the substrate.

16. The trap of claim 15, wherein at least a portion of the bottom surface is coated with an adhesive adapted to secure the trap to a surface.

* * * * *